United States Patent [19]
Williams

[11] Patent Number: 6,155,628
[45] Date of Patent: Dec. 5, 2000

[54] SUNSHADE ATTACHMENT FOR JOGGER TYPE STROLLERS

[76] Inventor: Yvonne M. Williams, 2645 Palmwood Cir., Thousand Oaks, Calif. 91362

[21] Appl. No.: 09/444,435

[22] Filed: Nov. 22, 1999

[51] Int. Cl.[7] .................................................. B62B 9/14
[52] U.S. Cl. ..................................... 296/97.21; 280/47.38
[58] Field of Search ............................... 296/97.1, 97.21; 280/47.38

[56] References Cited

U.S. PATENT DOCUMENTS

| | | | |
|---|---|---|---|
| 5,460,395 | 10/1995 | Chen | 280/47.38 |
| 5,758,889 | 6/1998 | Ledakis | 280/47.38 |
| 5,975,558 | 11/1999 | Sittu | 280/47.38 |
| 6,012,756 | 1/2000 | Clark-Dickson | 296/97.21 |
| 6,068,322 | 5/2000 | Kuester | 296/97.21 |

*Primary Examiner*—Gary C. Hoge
*Attorney, Agent, or Firm*—Edward E. Roberts

[57] ABSTRACT

A sheet of flexible cloth-like sunshade material with a support rod fitted within a hem sewn into the upper edge thereof. A pair of clips is provided for attachment of the upper edge to the canopy support bar. A bracket arrangement is attached to or adjacent to the front wheel, and at least one of the bracket arrangement and the lower edge of the sunshade is provided with attachment means for securing the bottom edge relative to the jogger stroller. In one arrangement, the lower edge is provided with hook and eye strips such as Velcrol™ strips for encircling the bracket arrangement. In another, the bottom edge has one of the hook or eye strips of Velcro™ material with the other of the hook or eye material being attached to the bracket.

9 Claims, 6 Drawing Sheets

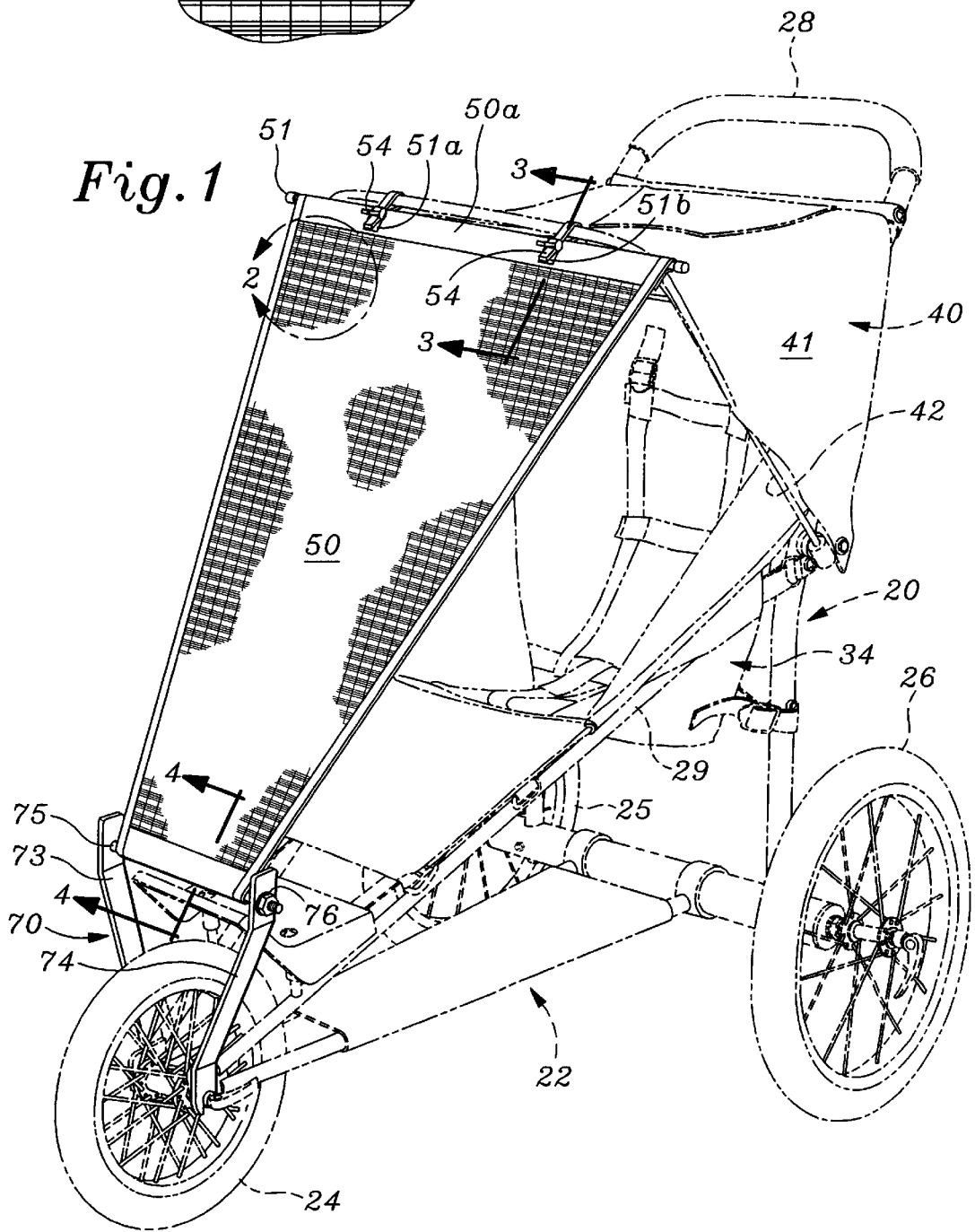
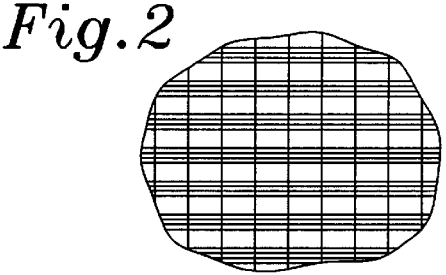
Fig. 2
Fig. 1

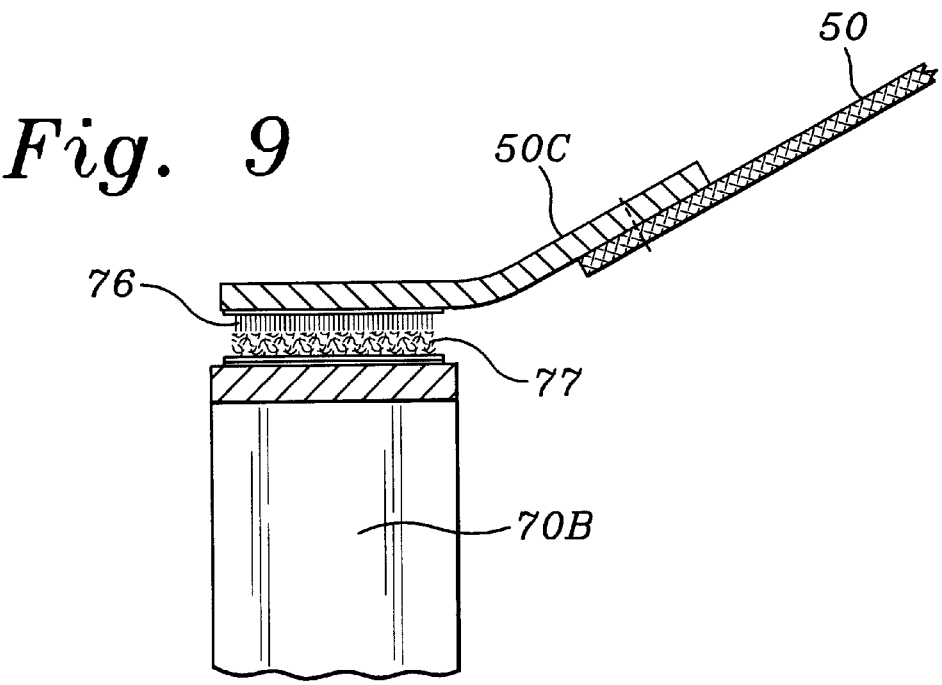
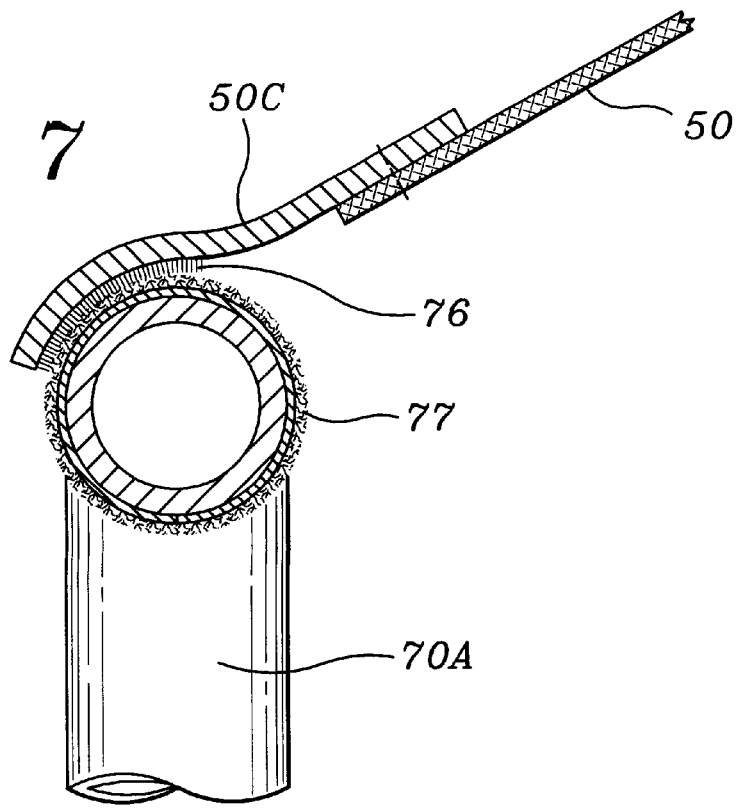

SUNSHADE ATTACHMENT FOR JOGGER TYPE STROLLERS

BACKGROUND OF THE INVENTION

1. Field of the Invention

This invention relates to sunshades formed of flexible screen and cloth-like material, and more particularly to a sunshade attachment for a jogger type child's stroller or the like.

2. Description of the Prior Art

Baby strollers of the jogger type are conventionally configured with a seating area for an infant and have a preferably tricycle or three-wheel assembly. A canopy is provided for protecting the child, with the canopy being attached to a metallic support rod, which is generally, u-shaped and pivotably attached to the handlebars.

Oftentimes, a full enclosure is provided of a flexible material which essentially places the child within a cage formed of flexible cloth-like material. Such full enclosures unless attached to the stroller initially on use, are bulky and cumbersome to carry along. The same is true if initially attached and then removed due to changing weather conditions.

In accordance with a feature of the present invention there is provided a new and improved compact stowable protector for a child in a jogger type baby stroller the protector preferably being in the form of a flexible sheet of sunshade protective screen or the like, with clips or the like for immediate attachment to and detachment from a jogger type stroller.

SUMMARY OF THE INVENTION

The foregoing and other objects of the invention are accomplished by providing a sheet of flexible cloth-like sunshade material with a support rod sewn into the upper edge thereof. A pair of clips is provided for attachment of the upper edge to the canopy support bar. A bracket arrangement is attached to or adjacent to the front wheel, and at least one of the bracket arrangement and the lower edge of the sunshade is provided with attachment means for securing the bottom edge relative to the jogger stroller. In one arrangement, the lower edge is provided with hook and eye strips such as Velcro™ strips for encircling the bracket arrangement. In another, the bottom edge has one of the hooks or eye strips of Velcro™ material with the other of the hook or eye material being attached to the bracket. Although designed primarily for sunshade protection, the invention likewise provides some protection from the wind and airborne objects.

Other objects features and advantages of the invention will become apparent on a reading of the specification when taken in conjunction with the drawings in which like reference numerals refer to like elements in the several views.

BRIEF DESCRIPTION OF THE DRAWINGS

FIG. 1 is a front perspective view of a jogging stroller (shown in phantom illustration) having attached thereto the sunshade according to the invention;

FIG. 2 is an enlarged fragmentary view of the sunshade material of FIG. 1 from the encircled area designated by a circular arrow 2;

FIG. 7 is a cross-sectional view of the attachment of the lower edge of the sunshade of FIG. 6 as viewed along line 7—7 thereof.

FIG. 9 is a cross-sectional view of the attachment of the lower edge of the sunshade of FIG. 8 as viewed along line 9—9 thereof;

DESCRIPTION OF THE PREFERRED EMBODIMENT

Figure 3:
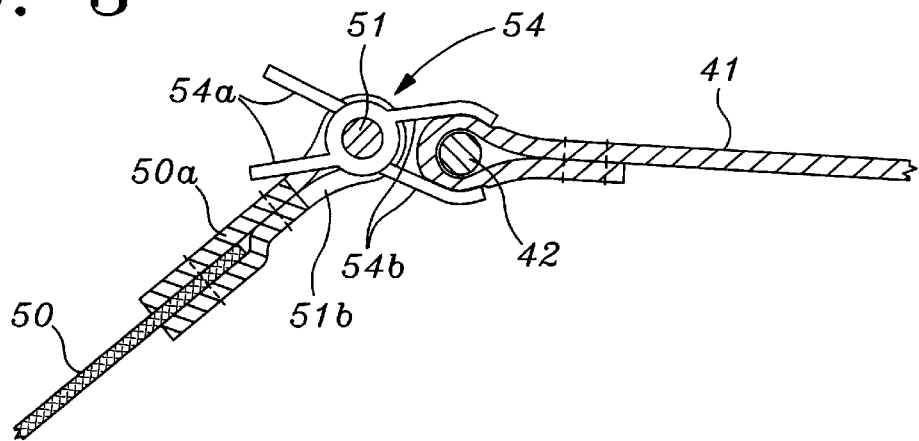
FIG. 3 is a cross-sectional view of the attachment of the upper edge of the sunshade of FIG. 1 as viewed along line 3—3 thereof.

Referring now to the drawings, and particularly to FIGS. 1 and 2, there is shown, in phantom illustration, a three-wheeled jogging stroller, Generally designated 20, the total description of which is not necessary to the present invention. A detailed description may be had with reference to U.S. Pat. No. 5,536,033, which forms no part of this invention. For the purposes of the present invention, it will suffice to note that the stroller 20 includes a wheel support frame, generally designated 22, for rotatably supporting three pneumatic tire wheels 24, 25 and 26 in a tricycle configuration, that is, two rear wheels 25, 26 and a front wheel 24. At the rear end of the frame 22, a Generally upright handle bar 28 has the lower ends thereof attached to the frame 22 Side tubes 29 (only one of which is shown) support, in conjunction with the handlebar 28, a flexible cloth-like seat, generally designated 34.

Concerning the stroller 20, of relevance to the present invention is the canopy, generally designated 40, which is formed of a flexible cloth-like material 41 fitted over a pivotable generally U-shaped canopy support bar 42 for providing an upper cover member of an occupant of the seat 34. A sunshade 50 has the upper edge thereof releasably attached to the leading edge of the canopy support bar 42. For purpose of attachment of the lower edge, and in accordance with the present invention, an inverted, generally U-shaped bracket arrangement, generally designated 70. has the lower free ends thereof attached to the axle of the front wheel 24.

The bracket arrangement 70 shown in FIG. 1 is only one of several, as will be described. In this embodiment, the bracket arrangement 70 includes a pair of like-shaped outer bars 73, 74 having an interconnecting crossbar 75 threaded at the ends and passed through apertures in the upper ends of bars 73, 74, and suitably secured thereon by nut members 76 (only one of which is shown). Bars 73 and 74 are formed with cutouts in the lower ends thereof for being received on the axle of wheel 24. As can be seen in FIG. 1, the bars 73, 74 are bent to form a bicycle-like front fork member, with the upper lateral dimension being much greater than the lateral dimension at the point of attachment at the axle. The crossbar 75 may be of circular or rectangular or any other convenient cross-section. Alternative configurations of the bracket arrangement are shown in FIGS. 14–17 which effectively show a fork 70A formed of tubular material flattened at the top; fork 70B, formed of bar stock flattened at the top, and fork 70C formed of tubular material arched at the top.

Figure 5:
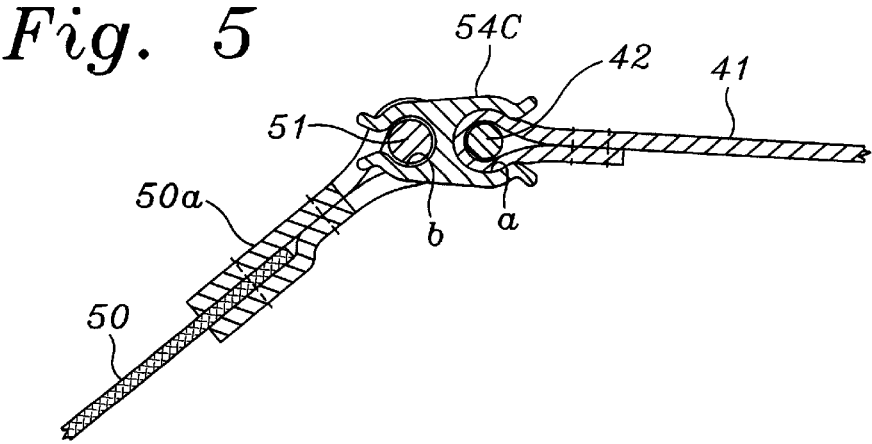
FIG. 5 is a view similar to FIG. 3 depicting an alternate embodiment of the attachment of the upper edge of the sunshade to the canopy support bar.
Figure 10:
FIG. 10 is a front view of the support rod sewn into the upper edge of the sunshade of FIG. 1.

The sunshade 50 is formed as a sheet of inverted trapezoidally configured form, with an open mesh as shown in FIG. 2. By varying spacing and density of the filaments within the mesh, the resulting pattern decreases glare while permitting ventilation. The sheet material is preferably formed of a plastic or nylon filament mesh sheet material, which is lightweight, yet sturdy. The sunshade 50 is provided with a support rod 51 (see also FIG. 10) sewn into a reinforcing hem 50a (see also FIG. 5) of the upper edge of the sunshade 50 for rigidity. At two intermediate points 51a, 51b, the sunshade hem is notched to expose the support rod 51. These points 51a, 51b are the attachment points for attachment of the sunshade 50 to the canopy support bar 42.

One method of attachment is by use of clips 54, such as shown in FIG. 3. These particular clips 54 are captively retained on the support rod 51 and are much like spring, biased clothes pins with the pivot point being the support rod 51. The handles 54a, when clasped, open the jaws 54b against the force of a spring (not shown) which lies between the two halves of the clip 54. The clip 54 is then placed with the open jaws 54b over the canopy support bar 42 and released to the position shown in FIG. 3.

Figure 11:
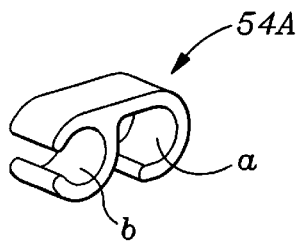
FIG. 11 is a perspective view of a first embodiment of a clip used for attachment of the upper edge of the sunshade.
Figure 12:
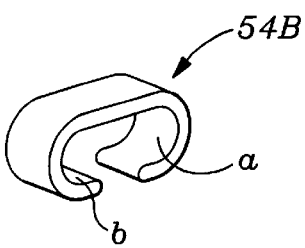
FIG. 12 is a perspective view of an alternate embodiment of a clip used for attachment of the upper edge of the sunshade.
Figure 13:
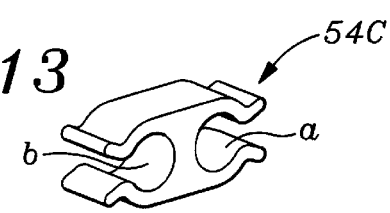
FIG. 13 is a perspective view of still another embodiment of a clip used for attachment of the upper edge of the sunshade.
Figure 14:
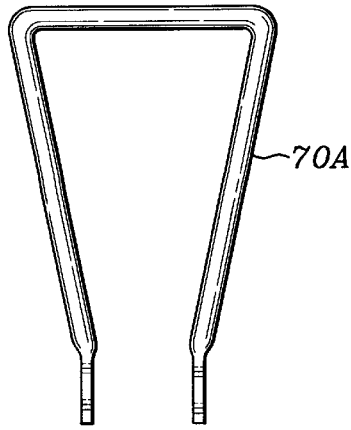
FIG. 14 is a front view of a first embodiment of a bracket for securing to the axle of the front wheel of the jogger for support of the lower edge of the sunshade.
Figure 15:
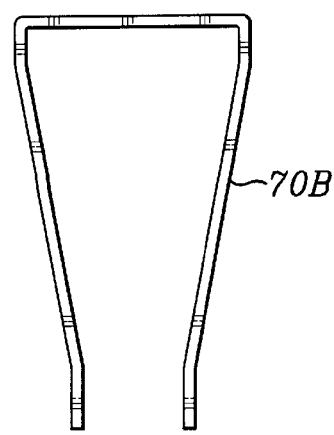
FIG. 15 is a front view of an alternate embodiment of a bracket for securing to the axle of the front wheel of the jogger for support of the lower edge of the sunshade.
Figure 16:
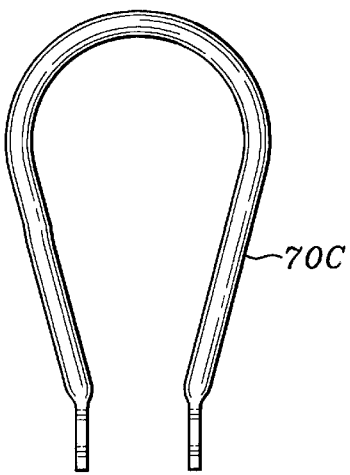
FIG. 16 is a front view of still another embodiment of a bracket for securing to the axle of the front wheel of the jogger for support of the lower edge of the sunshade.

Other clip configurations, which may be readily utilized for upper edge attachment, are shown in FIGS. 11 through 13. These particular clips are separate components not captively retained by the support rod 51. FIG. 11 shows a clip 54A which has two left facing hook-shaped openings "a" and "b" for attachment to canopy support bar 42 and support rod 51, respectively FIG. 12 shows a clip 54B which is generally in the form of a "C" and has two facing hook-shaped openings "a" and "b" for attachment to canopy support bar 42 and support rod 51, respectively. The clip 54C of FIG. 13 shows two oppositely facing hook-shaped openings "a" and "b" for attachment to the canopy support bar 42 and the support rod 51, respectively. This clip 54C is depicted in use in FIG. 5 with the hook opening "a" frictionally connected to the canopy support bar 42 and the opening "b" frictionally received on the sunshade support bar 51. All of these clips 54A–54C may be formed of nylon or plastic material with a certain amount of flexibility and rigidity, the primary object being to provide a releasable attachment of the upper edge of sunshade 50 to the canopy support bar 42.

Figure 4:
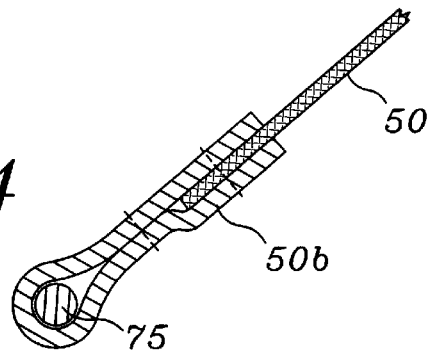
FIG. 4 is a cross-sectional view of the attachment of the lower edge of the sunshade of FIG. 1 as viewed along line 4—4 thereof.
Figure 6:
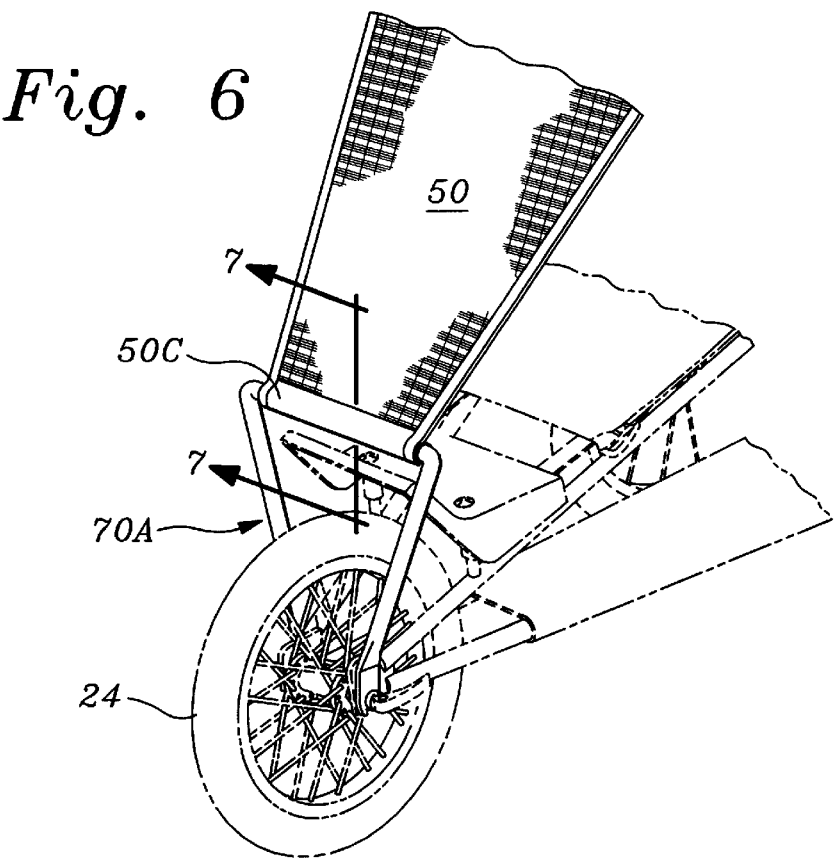
FIG. 6 is a partial front perspective view of a Jogging stroller (shown in phantom) illustrating an alternate embodiment of attachment of the lower edge of the sunshade.
Figure 8:
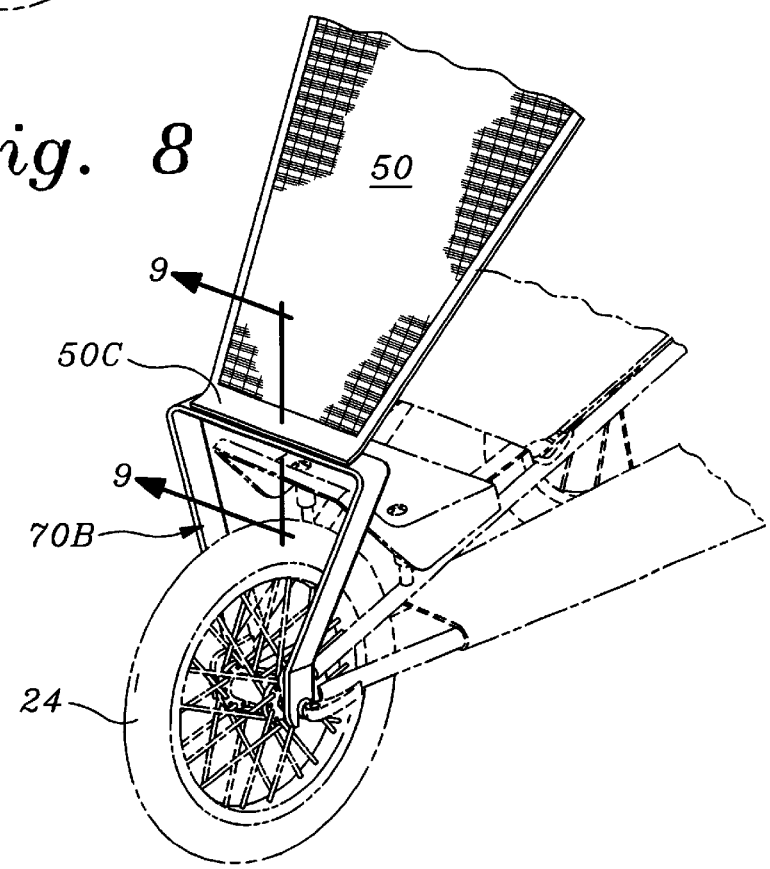
FIG. 8 is a partial front perspective view of a jogging stroller (shown in phantom illustration) illustrating still another embodiment of attachment of the lower edge of the sunshade.

With respect to the attachment of the bottom edge of the sunshade 50, as shown in FIGS. 1 and 4, the lower edge rod 75 is sewn into the hem 50b of the sunshade 50, this rod 75 having the ends thereof threaded for being received within the upper ends of the bars 73, 74 as previously described. For a more readily attachable and detachable arrangement, by reference to FIGS. 6, 7 and 14, the fork 70A is shown attached to the axle of the front wheel 24 with the flattened top thereof in generally parallel relation to the surface on which the wheel 24 rests. As best shown in FIG. 7, the lower hem 50c has sewn thereto, at the lower inside surface thereof, one of the hook or eye strips 76 with the other of the hook or eye strips 77 being bonded to the outer surface of the flattened tubular top of the fork 70A. The hook and eye strips, such as the product Velcro™, can be readily attached and removed for ease of use of the sunshade 50. Similarly, with respect to FIGS. 8, 9 and 15, the fork 70B, formed of bar stock, can be used. The hem 50c has secured thereto the eye strip of Velcro™ material with the hook strip 77 being attached to the upper surface of the crossbar portion of the fork 70B.

Figure 17:
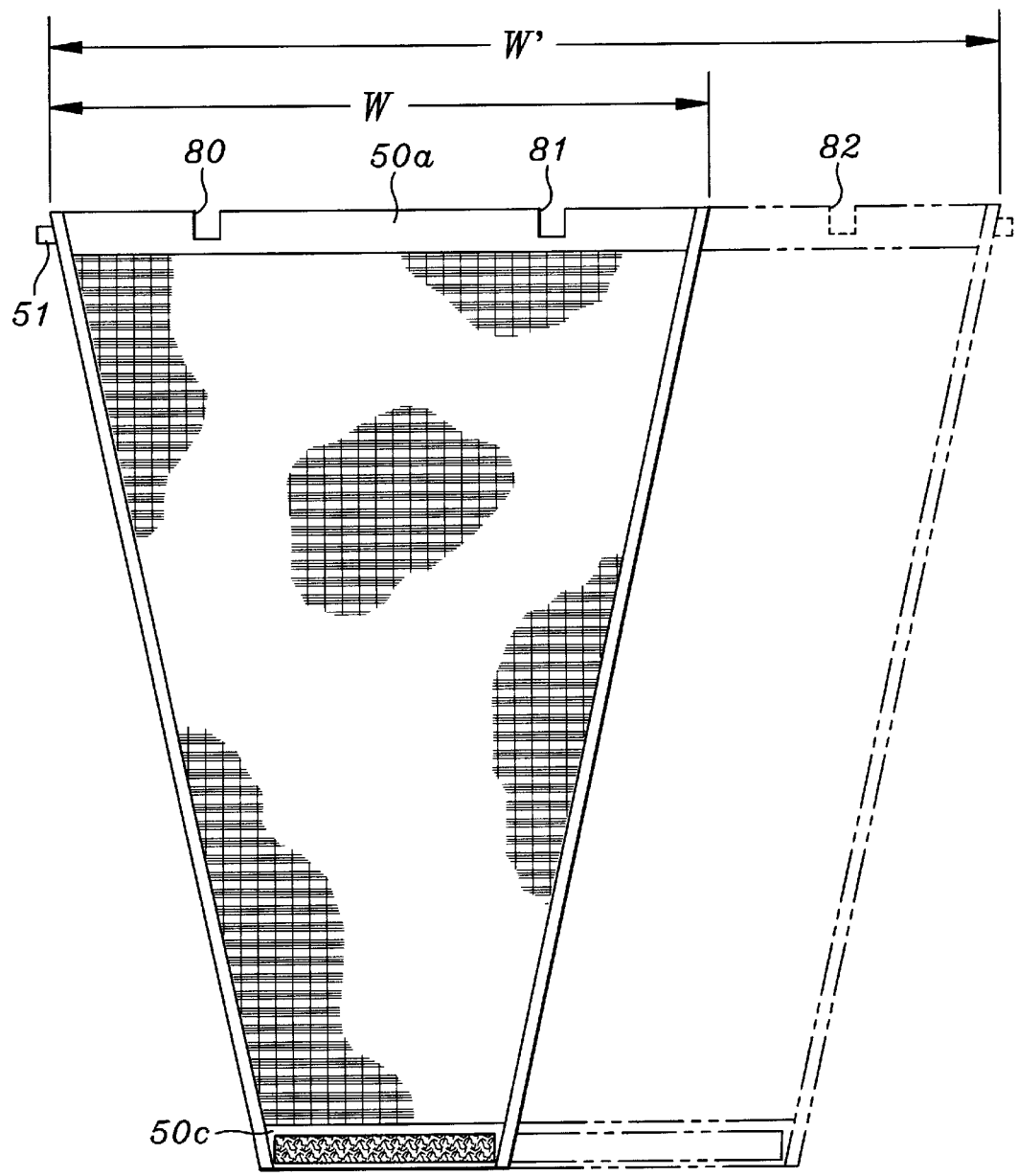
FIG. 17 is a front view of the sunshade according to the invention with the broken lines depicting an embodiment of different dimensions for a two-infant jogger type stroller.

FIG. 17 illustrates that the width W of the sunshade 50 may be extended to W' to accommodate a two infant stroller, with three notches 80–82 in the hem 50a and a corresponding lengthening, of the support rod 51. The lower hem 50c will be proportionately dimensioned to accommodate the change.

While the preferred embodiment has described the use Velcro™ hook-and-eye fasteners, snap fasteners may be suitably employed, if desired. In accordance with the present invention there has been shown and described a sunshade and mounting arrangement for a jogger type stroller or the like which may be readily attached and removed, formed of generally flexible cloth or cloth-like material and which is of economical compact construction. Although there has been shown and described a preferred embodiment, it is to be understood that other modifications may be made within the spirit and scope of the invention.

For instance, although a particular stroller configuration has been selected for purposes of describing the invention, it is to be understood that with obvious modifications the invention may equally well be adapted for use on strollers of other configuration.

What is claimed is:

1. A sunshade assembly for a tricycle jogging type stroller having a canopy bar for supporting a canopy, said assembly comprising:

bracket means for attachment to the stroller adjacent the axle of the front wheel thereof;

a sunshade formed of flexible cloth-like mesh material of inverted generally trapezoidally configured material;

a support rod fitted within a hem portion along the upper edge of said sunshade;

clip means for attachment of said sunshade to the canopy bar by means of said support rod; and means for attaching the lower edge of said sunshade to said bracket means.

2. The assembly of claim 1 wherein said bracket means is a fork member and said means for attachment of said lower edge of said sunshade includes coacting fastener means on said fork and said lower edge.

3. The assembly of claim 2 wherein said coacting fastener means includes a rod within a hem in said lower edge and said rod forms a removable crossbar part of said fork.

4. The assembly of claim 2 wherein said coacting fastener means includes a hem in said lower edge with separable hook and eye fastener strips secured one to said hem and one to the crossbar of said fork.

5. The assembly of claim 4 wherein said fork has a tubular cross-section and the crossbar portion is flattened to form a straight edge for interconnection with said sunshade.

6. The assembly of claim 4 wherein said fork is formed of bar stock and the crossbar portion is flattened to form a straight edge for interconnection with said sunshade.

7. The assembly of claim 1 wherein said sunshade has at least two notched out portions in the upper hem thereof and said clip means frictionally engage said support rod within said notched out portions.

8. The assembly of claim 1 wherein said sunshade has at least two notched out portions in the upper hem thereof and said clip means are fixed to said support rod within said notched out portions.

9. The assembly of claim 7 wherein said clip means include a first hook-shaped opening for frictionally engaging said support rod and a second hook-shaped opening for frictionally engaging the canopy support bar.

* * * * *